(12) United States Patent
Vache

(10) Patent No.: US 8,273,204 B2
(45) Date of Patent: Sep. 25, 2012

(54) METHOD FOR JOINING CELLULAR ACOUSTIC PANELS

(75) Inventor: Jean-Bernard Vache, Le Havre (FR)

(73) Assignee: Aircelle (FR)

( * ) Notice: Subject to any disclaimer, the term of this patent is extended or adjusted under 35 U.S.C. 154(b) by 278 days.

(21) Appl. No.: 12/864,377

(22) PCT Filed: Sep. 22, 2008

(86) PCT No.: PCT/FR2008/001317
§ 371 (c)(1),
(2), (4) Date: Jul. 23, 2010

(87) PCT Pub. No.: WO2009/092870
PCT Pub. Date: Jul. 30, 2009

(65) Prior Publication Data
US 2010/0294422 A1 Nov. 25, 2010

(30) Foreign Application Priority Data
Jan. 23, 2008 (FR) ..................................... 08 00346

(51) Int. Cl.
*B29C 65/48* (2006.01)

(52) U.S. Cl. ................... 156/196; 156/304.2; 156/304.5

(58) Field of Classification Search .................. None
See application file for complete search history.

(56) References Cited

U.S. PATENT DOCUMENTS

| 2,821,616 | A | * | 1/1958 | Spott ........................ 219/78.11 |
| 2,860,740 | A | | 11/1958 | Holland et al. |
| 3,549,468 | A | * | 12/1970 | Messineo et al. ............ 428/117 |
| 4,675,241 | A | | 6/1987 | Hull |
| 5,312,511 | A | * | 5/1994 | Fell ............................. 156/469 |
| 5,965,238 | A | | 10/1999 | Saitoh et al. |
| 6,039,832 | A | * | 3/2000 | McCarville ................ 156/292 |
| 2008/0047121 | A1 | * | 2/2008 | Douglas ................... 29/402.01 |

FOREIGN PATENT DOCUMENTS

| EP | 0293320 | 11/1988 |
| GB | 788769 | 1/1958 |
| JP | 11207423 | 8/1999 |

OTHER PUBLICATIONS

International Search Report; PCT/FR2008/001317; May 20, 2009.

* cited by examiner

*Primary Examiner* — John L. Goff
*Assistant Examiner* — Barbara J. Musser
(74) *Attorney, Agent, or Firm* — Cantor Colburn LLP

(57) ABSTRACT

The invention relates to a method for joining a first acoustic panel (2), having a cellular structure of the honeycomb type, with a second acoustic panel (2), wherein said method comprises the steps of: inserting at least one mandrel, (5, 8) having a shape adapted to the cells (3), into at least one cell (3) located in the vicinity of a junction edge (6) of the acoustic panel; passing a roller (12) on said junction edge of the acoustic panel; joining the junction edge of the acoustic panel together with a junction edge (6') of the second panel and connecting the same by applying a linking means.

6 Claims, 3 Drawing Sheets

METHOD FOR JOINING CELLULAR ACOUSTIC PANELS

TECHNICAL FIELD

The present invention concerns a method for joining a first acoustic panel having a cellular structure of the honeycomb type, with a second panel.

This method is more particularly intended for the assembly of acoustic panels equipping a jet engine nacelle.

BACKGROUND

Indeed, airplane jet engines generate significant noise pollution. There is a high demand for reducing this pollution, even more so given that the jet engines used are becoming increasingly powerful. The design of the nacelle surrounding the jet engine contributes in large part to the reduction of that noise pollution.

In order to further improve the acoustic performance of aircrafts, the nacelles are provided with acoustic panels aiming to attenuate the noise due to the circulation of flows of air through the jet engine as well as the vibrations of the structures of the nacelle.

The acoustic panels are of the sandwich-type structure well known for absorbing that noise. These panels usually include one or several layers of structures with a cellular core (structure commonly called "honeycomb"). The layers can then be coated on their so-called outer face, i.e. the face radially farthest from the axis of the engine, with an air-impermeable skin, called "full", and on their inner face, i.e. that radially closest to the axis of the engine, with an air-permeable perforated skin, called "acoustic".

In a known manner, the cellular core structure is realized from joined cellular units having cells of generally hexagonal or elliptical shape.

The acoustic properties of the acoustic panel, i.e. its noise absorption rate depending on the frequency and noise level of the noise, depend in particular on the junction of the cellular unit(s).

The joining of the lateral ends is commonly done using a foaming glue, such as AFM 410® glue, which has a significant capacity for expansion. The adjacent edges of the cellular unit(s) are coated with glue which, during its expansion, obstructs the cells by creating oversizes. These oversizes have the drawback of decreasing the effective acoustic surface of the cellular structure and also causing brutal impedance ruptures that contribute to decreasing the acoustic performance of the acoustic panel during the operation of the jet engine.

Moreover, prior to their assembly, the cellular panels are cut to the required dimensions.

This cutting operation created a junction edge where the cells can be crushed and destroyed, which further decreases the final acoustic performance.

It will also be noted that after the cutting operation, the junction edges obtained have remains of cellular walls protruding from the junction edge and which will disrupt the thickness of the assembly zone.

It is also known to join, edge to edge, several cellular units by opening the cells situated on the edges designed to be joined and to overlap the cells as well as openings one in the other.

However, the implementation of such a structure with a cellular core is not suitable for a structure with cellular core including only one cellular unit. Moreover, this implementation is complex.

BRIEF SUMMARY

In order to resolve the abovementioned drawbacks, the present invention concerns a method for joining a first acoustic panel having a cellular structure of the honeycomb type and a second panel, comprising the steps of:
- inserting at least one mandrel, having a shape adapted to the cells, into at least one cell located in the vicinity of a junction edge of the acoustic panel,
- passing a roller on said junction edge of the acoustic panel,
- joining the junction edge of the acoustic panel together with a junction edge of the second panel and connecting the same by applying a linking means.

Preferably, the connecting means is a gluing means.

Advantageously, the gluing means is a film of adhesive applied on at least one of the two junction edges.

Advantageously, the second panel is an acoustic panel having a cellular structure.

Preferably, the steps of introducing at least one mandrel and passage of a roller are also done on the second acoustic panel.

Advantageously, a mandrel is introduced into each of the cells situated near the junction edge.

Also advantageously, characterized in that the introduction of a mandrel in several cells is done simultaneously.

BRIEF DESCRIPTION OF THE DRAWINGS

The implementation of the invention will be better understood with the help of the detailed description below in light of the appended drawing.

DETAILED DESCRIPTION

Figure 1:
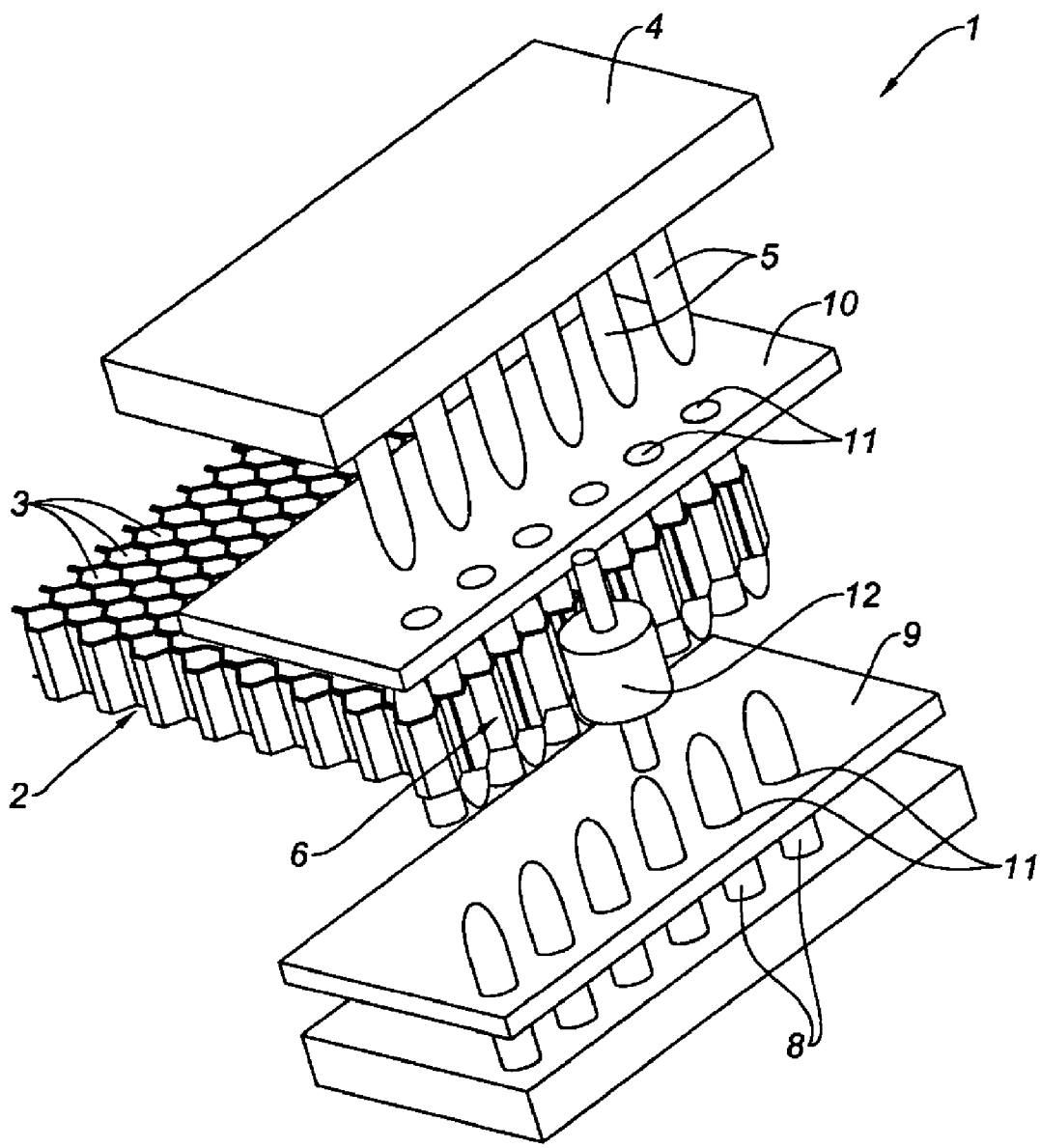
FIG. 1 is a diagrammatic view of a device allowing the implementation of the method.

FIG. 1 shows a device 1 for implementing the method according to the invention to join an acoustic panel 2 having a cellular structure comprising cells 3 of hexagonal shape.

This device comprises an upper plate 4 supporting a plurality of mandrels 5 each having a general section in the form of cells 3 and arranged regularly spaced such that each mandrel 5 can be introduced into every other cell 3 of a junction edge 6 of the acoustic panel 2.

The device 1 also comprises a lower plate 7 also supporting a plurality of mandrels 8 each having a general section in cell form 3 and disposed regularly spaced such that each mandrel 8 can be introduced into every other cell 3 of the junction edge 6 of the acoustic panel 2.

The device also comprises lower 9 and upper 10 plates for maintaining the acoustic panel each having openings 11 capable of being passed through by the mandrels 5, 8.

The device 1 lastly comprises a roller 12 situated so as to be able to roll along the junction edge 6 of the acoustic panel 2.

From an acoustic panel 2 cut out along a junction edge 6 by which it is designed to be joined with another acoustic panel, the mandrels 5, 8 of the upper 4 and lower 7 plates are introduced through the maintenance plates 9, 10 and inside corresponding cells 3.

Each mandrel 5 of the upper plate 4 therefore penetrates a cell 3 next to a cell 3 inside which a mandrel 8 of the lower plate 7 is introduced.

The introduction of the mandrels 5, 8 inside cells 3 makes it possible to reshape them after any deformation or crushing due to the cutting of the acoustic panel 2.

Once the mandrels 5, 8 are introduced into the cells 3, the junction edge 6 is itself shaped owing to the roller 12, which is passed all along the junction edge 6.

Thus, any remains 60 of the cellular walls due to the cutting are flattened and crushed against the junction edge 6.

The mandrels 5, 8 make it possible for the roller 12 not to crush the cells during this shaping operation.

Figure 2:
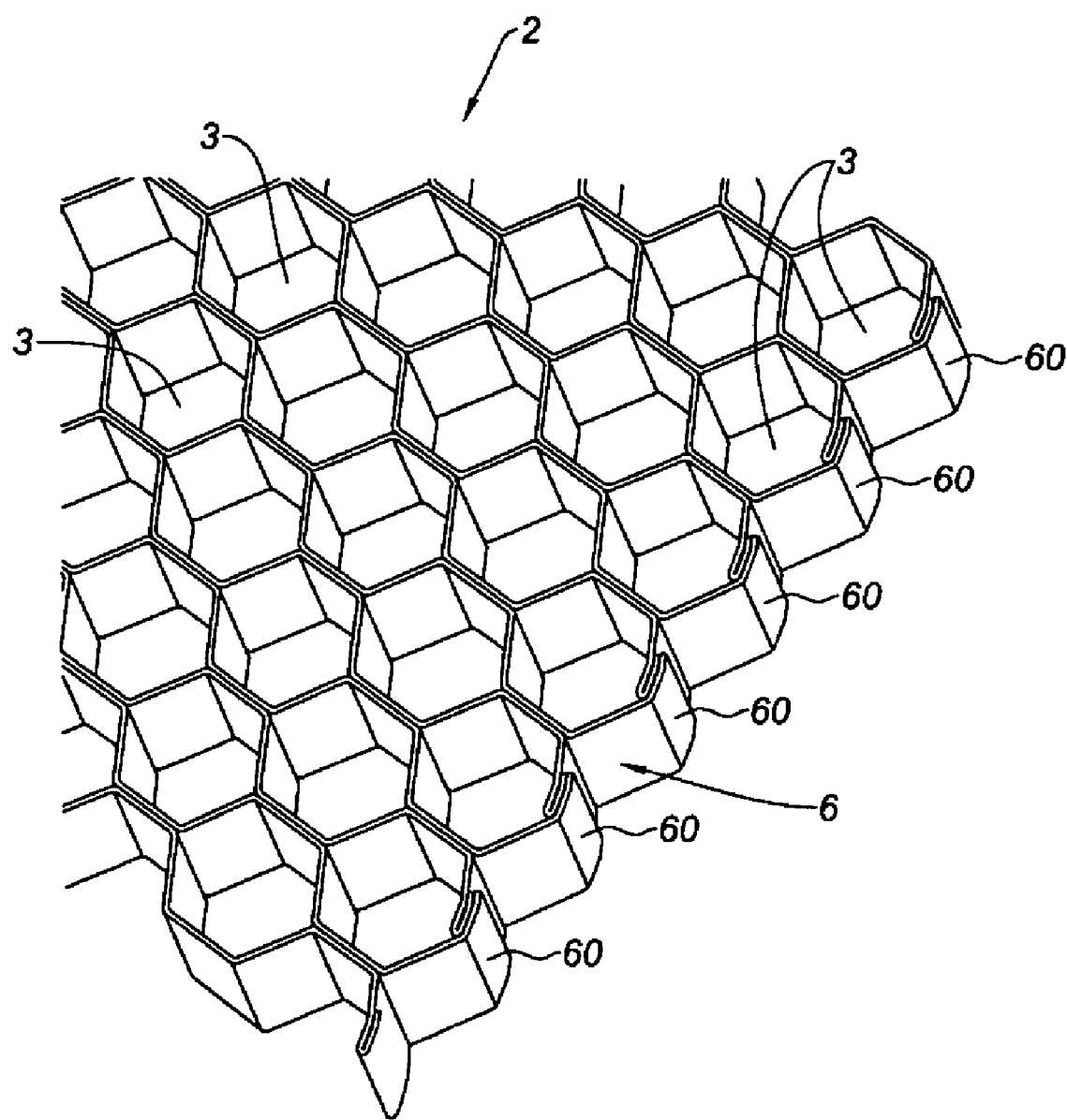
FIG. 2 is a diagrammatic illustration of an acoustic panel after implementation of the method.

A cellular acoustic panel 2 shaped using the device of FIG. 1 is shown in FIG. 2.

The method is repeated on a second acoustic panel 2' along a junction edge 6'.

Figure 3:
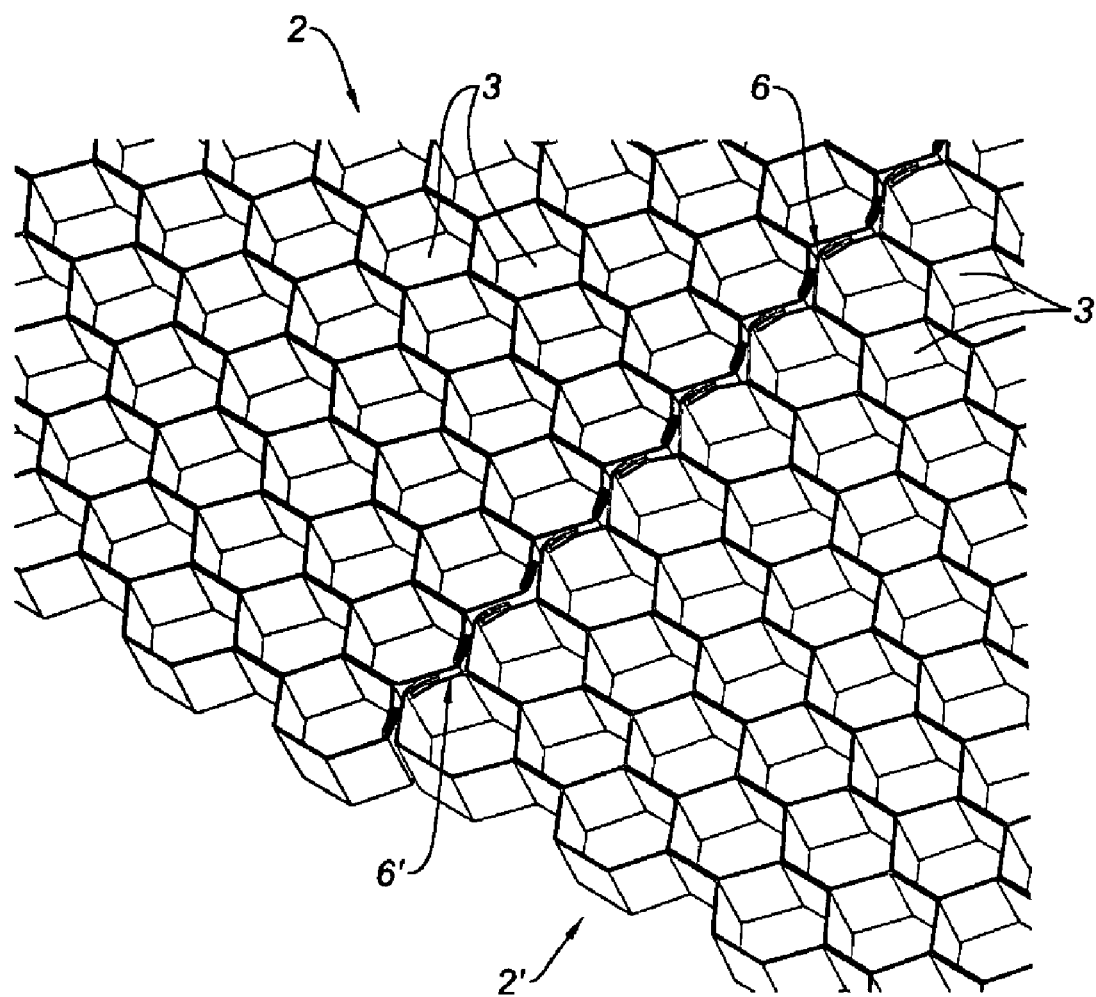
FIG. 3 is an illustration of two acoustic panels once joined.

The junction of the two acoustic panels 2, 2' thus configured is traditionally done by application of an adhesive film on the junction edge and interlocking. Two acoustic panels 2, 2' thus assembled are shown in FIG. 3.

Although the invention was described with one particular embodiment, it is obvious that it is in no way limited thereto and that it comprises all of the technical equivalents of the means described as well as their combinations if these fall within the scope of the invention. In particular, an acoustic panel can be joined to a non-acoustic panel, and other adhesive means can be used.

The invention claimed is:

1. A method for joining a first acoustic panel having a cellular structure of a honeycomb type and a second acoustic panel having a cellular structure, comprising:
   introducing at least one mandrel having a shape adapted to the cells in at least one cell situated near a junction edge of the first acoustic panel,
   passing a roller on said junction edge of the first acoustic panel,
   joining the junction edge of the first acoustic panel together with a junction edge of the second acoustic panel and connecting the same by applying a linking means.

2. The method according to claim 1, wherein the linking means is an adhesive means.

3. The method according to claim 2, wherein the adhesive means is an adhesive film applied on at least one of the two junction edges.

4. The method according to claim 1, wherein said introducing the mandrel and said passing of the roller are also used on the second acoustic panel.

5. The method according to claim 1, wherein a mandrel is introduced into each of the cells situated near the junction edge.

6. The method according to claim 5, wherein the introduction of a mandrel into several cells is done simultaneously.

* * * * *